United States Patent [19]
Ayerst et al.

[11] Patent Number: 5,649,294
[45] Date of Patent: Jul. 15, 1997

[54] METHOD AND APPARATUS FOR DELIVERING GLOBAL EVENT INFORMATION IN A RADIO COMMUNICATION SYSTEM

[75] Inventors: Douglas I. Ayerst, Delray Beach; Morris Moore, Wellington, both of Fla.

[73] Assignee: Motorola, Inc., Schaumburg, Ill.

[21] Appl. No.: 418,733

[22] Filed: Apr. 7, 1995

[51] Int. Cl.[6] .................................................... H04B 7/00
[52] U.S. Cl. ...................................... 455/38.1; 455/517
[58] Field of Search .......................... 455/17, 34.1, 38.1, 455/54.1, 56.1; 370/110.1, 95.1, 95.3; 340/825.44

[56] References Cited

U.S. PATENT DOCUMENTS

| | | | |
|---|---|---|---|
| 4,644,347 | 2/1987 | Lucas et al. | 340/825.44 |
| 5,014,345 | 5/1991 | Comroe et al. | 455/54.1 |
| 5,475,374 | 12/1995 | Moore | 340/825.44 |

FOREIGN PATENT DOCUMENTS 5-95321  4/1993  Japan.

*Primary Examiner*—Reinhard J. Eisenzopf
*Assistant Examiner*—Marsha D. Banks-Harold
*Attorney, Agent, or Firm*—James A. Lamb

[57] ABSTRACT

A technique for communicating global information in a radio communication system (100) in which a radio (106) is in a receive state during a first predetermined period of each of a plurality of transmission cycles (320) includes decoding a global event indicator (344) in a system information portion (331) of the first predetermined period of a first transmission cycle (320), setting the radio (106) to the receive state during a second predetermined period of a second transmission cycle (320), receiving the second predetermined period, decoding global event information in the second predetermined period, and processing the global event information. The second transmission cycle (320) is subsequent to the first transmission cycle (320).

18 Claims, 7 Drawing Sheets

1

METHOD AND APPARATUS FOR DELIVERING GLOBAL EVENT INFORMATION IN A RADIO COMMUNICATION SYSTEM

FIELD OF THE INVENTION

This invention relates in general to delivering information in a radio communication system, and in particular to delivering global event information efficiently to active radios in a radio communication system in which the active radios have intermittent active receive states at different times.

BACKGROUND OF THE INVENTION

In a system in which messages are transmitted from a fixed transmission network to a plurality of radios on an individual basis, such as a paging system, it is sometimes desirable to send a common message or common command to all the radios currently active within the system. This situation is herein termed a global event. Examples of such global events are an all call information message (e.g., a time update or a new software download) and a command directing all radios to alter an acknowledgment mode from synchronous to asynchronous. In some radio communication systems, such as paging systems, the plurality of radios are each in a receiving mode at unique predetermined times during a defined radio transmission cycle. One use of unique predetermined times is to provide battery longevity in a selective call radio communication system, by allowing each radio to be in a low power mode for a large percentage of time, except when one or more messages are queued for delivery to the radio. Another use of unique predetermined times is for sending different information at different successive periods to each of individual radios or groups of radios having no selective call addresses. In such systems, a known means of delivering a global event is to send the global event in every unique predetermined time or successive period. However, this approach involves sending the global event information repetitively, and therefore reduces throughput in the system. The reduction can be very significant in systems having large numbers of unique predetermined times or successive periods.

A technique is described in laid open Japanese Patent Application 3-170755, having a laid open date of 16 Apr. 1993, which is for use in Post Office Code Standardization Advisory Committee (POCSAG) radio systems. The technique uses a special batch sequence which allows for the transmission of control information, beginning with a notification sequence. The notification sequence begins with the transmission of the system ID as the first address code word of each frame in a batch of eight frames. Since the system ID is a reserved address code word, only nationwide pagers respond to the system ID. Following the system 1713 a notification address code word as the second code word in each frame of the notification sequence. The notification address code word is also a reserved code word like the system ID. Once all nationwide pagers have been notified that control information is to be transmitted in the following batch, all nationwide pagers, regardless of which frame the pagers are assigned, begin receiving the overhead data starting in the first frame of the next message batch. The overhead data provides specific system related information which is used to improve the scanning efficiency of the nationwide pager. The technique, although useful for sending control information to all active nationwide pagers in a paging communication system, is less efficient than desirable for other systems because all words in a batch are used for conveying the notification, and the technique is restrictive in that only nationwide pagers are able to be notified.

Thus, what is needed is an improved technique for efficiently communicating a global event to all active radios in a radio communication system in which the radios are in a receive state during a predetermined portion of a transmission cycle.

SUMMARY OF THE INVENTION

Accordingly, in a first aspect of the invention, a method is used in a system controller for efficiently communicating global information to a plurality of radios in a radio communication system in which each of the plurality of radios is in a receive state during a synchronization portion of one or more predetermined periods of a plurality of transmission cycles and in which each of the plurality of radios is not necessarily in a receive state during a first predetermined period of each of the plurality of transmission cycles. The method includes five steps. One step is determining a global event occurrence and global event information associated with the global event occurrence. The global event information is for communication to the plurality of radios. Another step is including a global event indicator in the synchronization portion of each of a plurality of periods, including the one or more predetermined periods, which are for transmission in a first transmission cycle. The global indicator indicates that the plurality of radios are to be set in the receive state during the first predetermined period of the second transmission cycle. Another step is transmitting the plurality of periods during the first transmission cycle. Another step is including the global event information in the first predetermined period which is for transmission in a second transmission cycle which is subsequent to the first transmission cycle. Another step is transmitting the first predetermined period in the second transmission cycle.

In a second aspect of the invention, a method is used in a radio for receiving global information in a radio communication system in which the radio is in a receive state during a synchronization portion of a first predetermined period of a plurality of transmission cycles and is not necessarily in a receive state during a second predetermined period of each of the plurality of transmission cycles. The method includes six steps. One step is receiving the first predetermined period of a first transmission cycle. Another step is decoding a global event indicator in the synchronization portion of the first predetermined period. Another step is setting the radio to the receive state during the second predetermined period of a second transmission cycle in response to the global indicator. The second transmission cycle is subsequent to the first transmission. Another step is receiving the second predetermined period. Another step is decoding global event information in the second predetermined period. Another step is processing the global event information.

In a third aspect of the invention, a system controller is for efficiently communicating global information to a plurality of radios in a radio communication system in which each of the plurality of radios is in a receive state during a synchronization portion of one or more predetermined periods of a plurality of transmission cycles and in which each of the plurality of radios is not necessarily in a receive state during a first predetermined period of each of the plurality of transmission cycles. The system controller includes a global event element, a global event indicator element, a global event information element, and a cell site controller. The global event element determines a global event occurrence and global event information associated with the global event occurrence. The global event information is for communication to the plurality of radios. The global event indicator element, which is coupled to the global event element, includes a global event indicator in the synchronization portion of each of a plurality of periods, including the one or more predetermined periods, which are for transmission in a first transmission cycle. The global indicator indicates that the plurality of radios are to be set in the receive state during the first predetermined period of the second transmission cycle. The global event information element, which is coupled to the global event element, is for including the global event information in the first predetermined period which is for transmission in a second transmission cycle which is subsequent to the first transmission cycle. The cell site controller, which is coupled to the global event indicator element and the global event information element, is for sending the first transmission cycle and second transmission cycle to a transmitter/receiver for radio transmission.

In a fourth aspect of the invention, a radio is for receiving global information in a radio communication system in which the radio is in a receive state during a synchronization portion of a first predetermined period of each of a plurality of transmission cycles and is not necessarily in a receive state during a second predetermined period of each of the plurality of transmission cycles. The radio includes a receiver, a global event indicator element, a receive state controller, an information decoder, and an information processor. The receiver is for receiving the first predetermined period of a first transmission cycle. The global event indicator element, which is coupled to the receiver, is for decoding a global event indicator in the synchronization portion of the first predetermined period. The receive state controller, which is coupled to the receiver and the global event indicator element, is for setting the radio to the receive state during the second predetermined period of a second transmission cycle. The second transmission cycle is subsequent to the first transmission cycle. The receiver is further for receiving the second predetermined period. The information decoder, which is coupled to the receiver, is for decoding global event information in the second predetermined period. The information processor, which is coupled to the information decoder, is for processing the global event information.

DETAILED DESCRIPTION OF THE INVENTION

Figure 1:
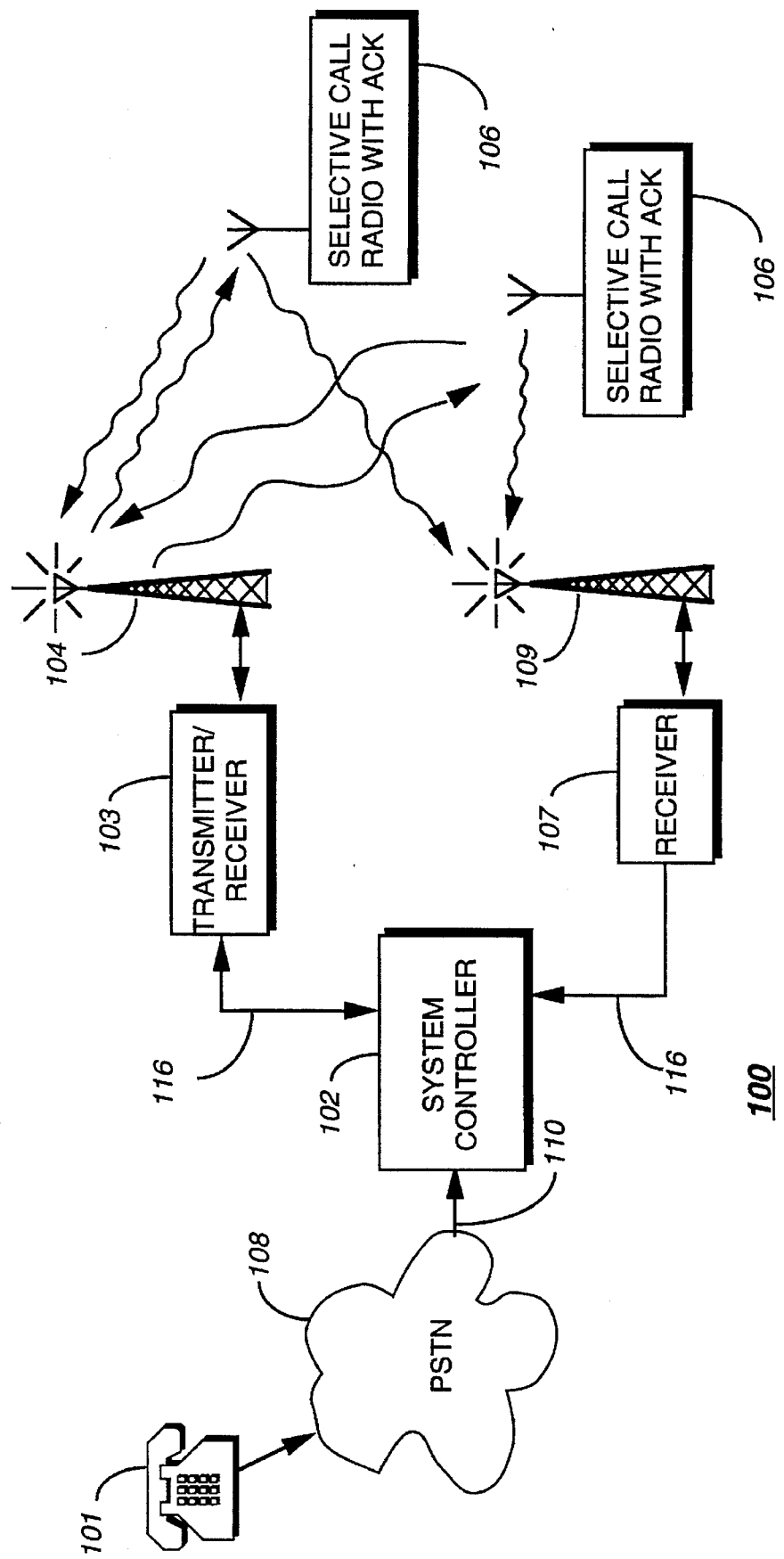
FIG. 1 is an electrical block diagram of a radio communication system, in accordance with a preferred embodiment of the present invention.

Referring to FIG. 1, an electrical block diagram of a radio communication system 100 is shown in accordance with the preferred embodiment of the present invention. The radio communication system 100 comprises a message input device, such as a conventional telephone 101 connected through a conventional switched telephone network (PSTN) 108 by conventional telephone links 110 to a system controller 102. The system controller 102 oversees the operation of at least one radio frequency transmitter/receiver 103 and at least one fixed system receiver 107, through one or more communication links 116, which typically are twisted pair telephone wires, and additionally can include RF, microwave, or other high quality audio communication links. The system controller 102 encodes and decodes inbound and outbound telephone addresses into formats that are compatible with land line message switch computers. The system controller 102 also functions to digitally encode and schedule outbound messages, which can include such information as digitized audio messages, alphanumeric messages, and response commands, for transmission by the radio frequency transmitter/receivers 103 to a plurality of multichannel selective call radios 106. The system controller 102 further functions to decode inbound messages, including unsolicited and response messages, received by the radio frequency transmitter/receivers 103 and the fixed system receivers 107 from the plurality of selective call radios 106.

Examples of response messages are acknowledgments and designated response messages. Designated response messages are communicated in the inbound channel in portions named data units. An acknowledgment is a response to an outbound message initiated at the system controller 102. An example of an outbound alphanumeric message intended for a selective call radio 106 is a page message entered from the telephone 101. The acknowledgment indicates successful reception of the outbound message. A designated response message is a message sent from a selective call radio in response to a command included in an outbound message from the system controller 102. An example of a designated response message is a message initiated by the selective call radio 106, but which is not transmitted until after a response command is received from the system controller 102. The response command, in turn, is sent by the system controller 102 after an inbound message requesting permission to transmit the designated response message is communicated from the selective call radio 106 to the system controller 102. The response messages are preferably transmitted at a time designated within the outbound message or response command, but alternatively can be transmitted using a non-scheduled protocol, such as the ALOHA or slotted ALOHA protocol, which are well known to one of ordinary skill in the art.

An unsolicited message is an inbound message transmitted by a selective call radio 106 without having received an outbound message which requires a response. An example of an unsolicited message is an inbound message from a selective call radio 106 which alerts the radio communication system 100 that the selective call radio 106 is within radio range of the radio communication system 100. An unsolicited message can include a request to transmit a designated response and can include data such as alphanumeric, fax, or digitized voice data. Unsolicited messages are transmitted using an ALOHA or slotted ALOHA protocol. The outbound messages are included in outbound radio signals transmitted from a conventional antenna 104 coupled to the radio frequency transmitter/receiver 103. The inbound messages are included in inbound radio signals received by the conventional antenna 104 coupled to the radio frequency transmitter/receiver 103 and the conventional antenna 109 coupled to the fixed system receiver 107.

It should be noted that the system controller 102 is capable of operating in a distributed transmission control environment that allows mixing conventional cellular, simulcast, master/slave, or other coverage schemes involving a plurality of radio frequency transmitter/receivers 103, conventional antennas 104, 109, and fixed system receivers 107, for providing reliable radio signals within a geographic area as large as a nationwide network. Moreover, as one of ordinary skill in the art would recognize, the telephonic and selective call radio communication system functions may reside in separate system controllers 102 which operate either independently or in a networked fashion.

It should also be noted that the radio frequency transmitter/receiver 103 may comprise the fixed system receiver 107 collocated with a conventional radio frequency transmitter.

It will be appreciated that other selective call radio devices (not shown in FIG. 1), such as one and two way pagers, conventional mobile cellular telephones, mobile radio data terminals, mobile cellular telephones having attached data terminals, or mobile radios (trunked and non-trunked) having data terminals attached, and having single or multichannel receiving capability are also able to be used in the radio communication system 100. In the following description, the term "selective call radio" will be used to refer to the personal radio telephone, the portable transmitting/receiving device 106, a mobile cellular telephone, a mobile radio data terminal, a mobile cellular telephone having an attached data terminal, or a mobile radio (conventional or trunked) having a data terminal attached and having multichannel capability. Each of the selective call radios assigned for use in the radio communication system 100 has an address assigned thereto which is a unique selective call address. The address enables the transmission of a message from the system controller 102 only to the addressed selective call radio, and identifies messages and responses received at the system controller 102 from the selective call radio. Furthermore, each of one or more of the selective call radios also has a unique telephone number assigned thereto, the telephone number being unique within the PSTN 108. A list of the assigned selective call addresses and correlated telephone numbers for the selective call radios is stored in the system controller 102 in the form of a subscriber data base.

Figure 2:
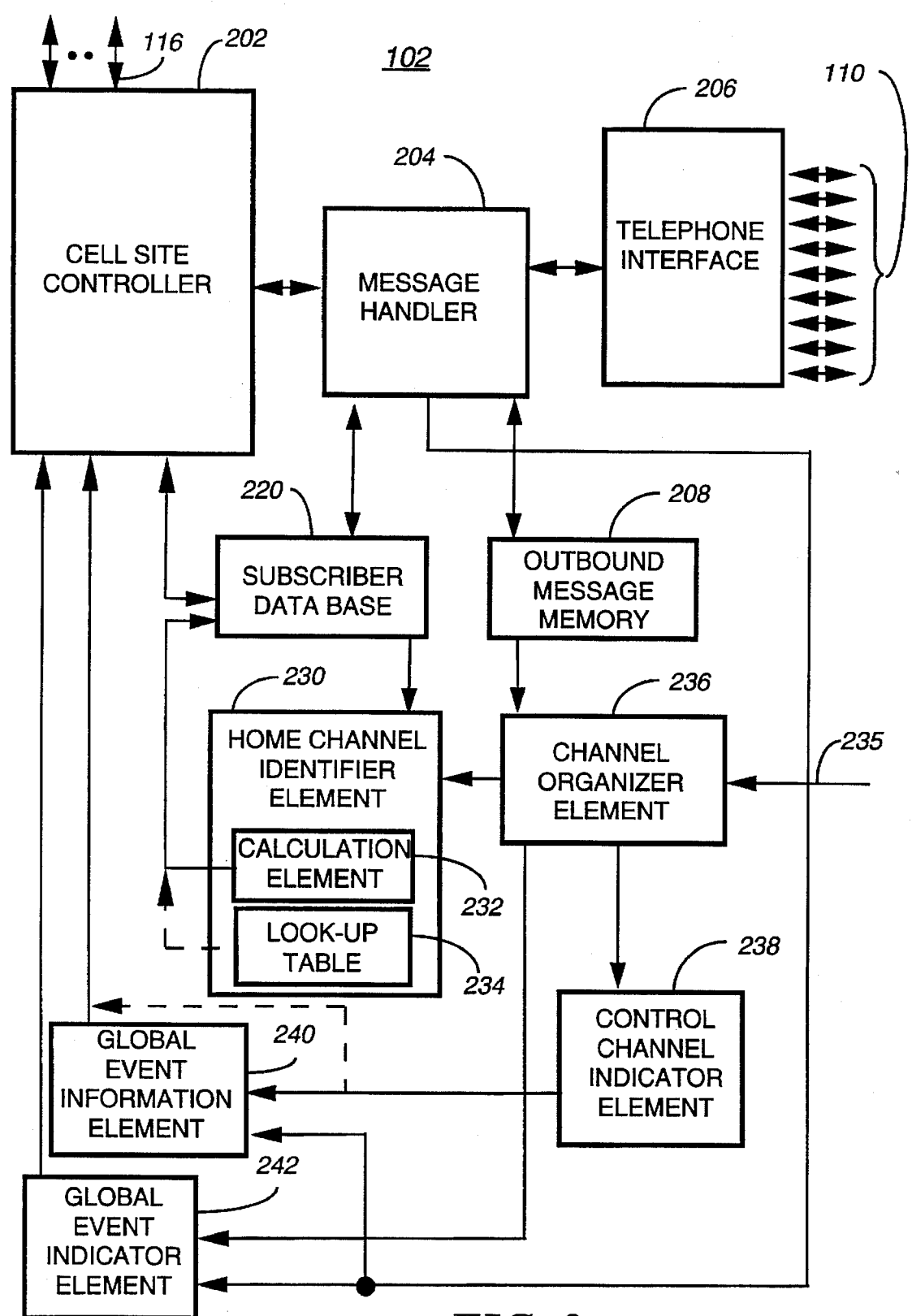
FIG. 2 is an electrical block diagram of a system controller used in the radio communication system, in accordance with the preferred embodiment of the present invention.

Referring to FIG. 2, an electrical block diagram of the system controller 102 is shown, in accordance with the preferred and alternative embodiments of the present invention. The system controller 102 comprises a cell site controller 202, a message handler 204, an outbound message memory 208, a subscriber data base 220, a telephone interface 206, a home channel identifier element 230, a channel organizer element 236, a control channel indicator element 238, a global event information element 240, and a global event indicator element 242. The cell site controller 202 is coupled to the radio frequency transmitter/receivers 103 (FIG. 1) and fixed system receivers 107 (FIG. 1) by the links 116. The cell site controller 202 couples outbound messages including selective call addresses to the transmitter/receivers 103 and controls the transmitter/receivers 103 to transmit transmission cycles which include the outbound messages. The cell site controller 202 also processes inbound messages from the selective call radios 106. The inbound messages are received by the transmitter/receivers 103 and fixed system receivers 107, and are coupled to the cell site controller 202. The message handler 204, which routes and processes messages, is coupled to the telephone interface 206, the subscriber data base 220, and the outbound message memory 208. The telephone interface 206 handles the switched telephone network 108 (PSTN) (FIG. 1) physical connection, connecting and disconnecting telephone calls at the telephone links 110, and routing the audio signals between the telephone links 110 and the message handler 204.

The subscriber data base 220 stores information for each subscriber, including a correlation between a selective call address assigned to each selective call radio 106 and the telephone number used within the PSTN 108 to route messages and telephone calls to each selective call radio 106, as well as other subscriber determined preferences, such as hours during which messages are to be held back from delivery to the selective call radio 106. The outbound message memory 208 is for storing a queue of messages which are queued for delivery to at least one of the plurality of selective call radios 106, wherein each message of the queue of messages is associated with a selective call address, also stored in the outbound message memory 208, of one of the plurality of selective call radios 106 for which each message is intended. The message handler 204 schedules outbound messages and the selective call addresses associated therewith within a transmission cycle. The message handler 204 also determines response schedules for response messages which minimize contention of messages at transmitter/receivers 103 and fixed system receivers 107, and includes response timing information in outbound messages so that selective call radios 106 will respond according to the response schedule. The message handler 204 identifies an inbound message as being a response message associated with one of the selective call radios in the subscriber data base 220, identifies the response message as being associated with one of the outbound messages in the outbound message memory 208. The message handler 204 then further processes the outbound and response messages according to their content. The cell site controller 202, the message handler 204, the outbound message memory 208, the subscriber data base 220, and the telephone interface 206, are conventional elements of the system controller 102.

As one example of an operation of the system controller 102, the delivery of an outbound message stored in the outbound message memory 208 is completed when the outbound message has been communicated to the intended selective call radio 106, the message is presented on a display of the selective call radio 106 by a user action, a message response is communicated back to the system controller 102 from the selective call radio 106, and the message response is identified by the message handler 204 as being a user acknowledgment generated by the selective call radio 106 specifically for the outbound message. In this example, the message handler 204 generates another message which is sent to the originator of the outbound message to notify the originator that the message has been acknowledged by the selective call radio 106.

Unique functions of the system controller 102 in accordance with the preferred embodiment of the present invention are included in the home channel identifier element 230, the channel organizer element 236, the control channel indicator element 238, the global event information element 240, and the global event indicator element 242.

In accordance with the preferred and alternative embodiments of the present invention, the radio communication system 100 uses a plurality of outbound radio channels for communication of outbound messages. The transmission cycles in the plurality of radio channels are preferably synchronized such that protocol divisions of the transmission cycles on each of the plurality of outbound radio channels occur simultaneously, down to the shortest division, which is a data symbol. The selective call radios 106 are multichannel radios, each capable of receiving on any one of the outbound radio channels. The system controller 102 organizes system and message information for transmission within the plurality of outbound radio channels, using a outbound signaling protocol based on the well known FLEX™ protocol by Motorola. As described more fully below, the outbound signaling protocol includes control frames and data frames. Selective call address information can be communicated in control frames but not in data frames. Radio channels which are used exclusively for control frames, or for control frames and data frames, are called control channels. Each selective call radio 106 is normally assigned to one of the control channels, which is called a home control channel, by the system controller 102. The radio channels used as control channels form a set of control channels which include at least one outbound radio channel, and may include up to all of the outbound radio channels, whereas the remaining channels, which include only data frames, are data channels. The number of radio channels used for control channels is altered depending on message traffic statistics within the system. For example, if a large percentage of the messages are short messages and the total amount of message information requires most of the capacity available on all outbound radio channels, then most or all of the outbound radio channels are used as control channels. It will be appreciated that one benefit of having fewer control channels is that the cell site controller 202 can pack long message information more efficiently into data channels.

Each selective call radio 106 in the radio communication system 100 is equipped with a battery saver element which normally prevents the selective call radio 106 from receiving radio signals except during a predetermined period of the transmission cycle. For example, in the protocol described below, there are 128 frames in each transmission cycle. Each selective call radio 106 in the system is typically assigned to receive during only one of the frames, or periods, in such a manner that the message traffic generated for all the active selective call radios 106 in the system is substantially evenly distributed. One method used for such distribution is to use the eight least significant bits of the selective call address to define the frame number of the frame which is the predetermined period, but other methods could be used. For example, a number could be programmed into the selective call radio 106 which explicitly determines a predetermined frame number.

The channel organizer element 236 is coupled to the outbound message memory 208, for determining a quantity of control channels which form the set of control channels. An example is when the radio system has been operating with a number of control channels (for example, two), and message traffic statistics change which require an additional control channel for optimum handling. As will be seen from more detailed descriptions below, the control channels handle short messages more optimally than the non-control channels, so that a shift in message length statistics can be a reason for an increase or decrease in the number of control channels. The channel organizer element 236 also is coupled to an input 235 from an operator console allowing a manual input which changes the number of control channels, for example, in response to new channel equipment having been added throughout the radio communication system 100. The channel organizer element 236 is coupled to the home channel identifier element 230, the control channel indicator element 238, and the global event indicator element 242. When a change in the number of control channels occurs, the event is coupled to the global event indicator element 242, while the new number of control channels is coupled to the home channel identifier element 230 and to the control channel indicator element 238. The change in the number of control channels is defined as a global event because it results in information which must be communicated to all active selective call radios 106. The control channel indicator element 238 encodes the number of channels into a portion of a code word, which is coupled to and stored in the global event information element 240. The encoded new number of channels constitutes the global event information associated with the global event. The global event indicator element 242 couples a signal to the cell site controller 202 which includes in each frame of the next complete transmission cycle within each outbound radio channel a global event indicator, which is decoded by each active selective call radio 106 when each selective call radio 106 decodes the predetermined frame which it is assigned in accordance with the battery saving function described above. The decoding of the global event indicator is described more fully below. Each selective call radio 106 is thereby alerted to decode frame zero of the transmission cycle subsequent to the one in which the global event indicator is sent repetitively, for decoding the global event information, which in this case is the new number of control channels. The global event information element 240 couples the global event information to the cell site controller 202 for inclusion in frames number zero of the transmission cycles which are within each of the set of control channels and which are subsequent to the one in which the global event indicator is sent. When each selective call radio 106 decodes the new number of control channels in frame zero, each selective call radio 106 then determines a new home control channel and sets its receiver to the new home channel to be able to receive any new information intended for the selective call radio 106. Because of the very important nature and brevity of the home control channel information, it is also included in frame zero of all transmission cycles within all control channels, for use by any selective call radio 106 which, for example, is coming onto the radio communication system 100 for a first time, or which receives the control channel information in error and must reacquire a home control channel. Other global event information, such as a lengthy all call text message, would not typically be repeated in additional cycles.

The home channel identifier element 230 uses the new number of control channels determined by the channel organizer element 236 and a predetermined control channel logical number which is stored in the subscriber data base 220 in association with the address of the selective call radio 106, and which is also stored in the selective call radio 106, to determine a new home control channel for the selective call radio 106. The new home control channel is coupled to and stored in the subscriber data base 220, along with the transmission cycle at which the new home control channel is effective. The new home control channel replaces the current home control channel stored in the subscriber data base 220 in association with the selective call radio 106 when subsequent messages are sent to the selective call radio 106, after the number of new channels has been sent as global event information in the identified frame zero of a transmission cycle (i.e., when the selective call radio 106 has switched to the new home control channel).

In accordance with the preferred embodiment of the present invention, the home channel identifier element 230 comprises a calculation element 232 which determines the new home control channel, H, as a mathematical function of the new number of control channels, N, and the predetermined control channel logical number, L. The new home control channel, N, is coupled to the subscriber data base 220. The mathematical function is expressed as the integral value of the remainder of a division of L by N. For example, when N is 3 and L is 5, then H is 2. This approach provides nearly uniform distribution of home control channel assignments over the plurality of selective call radios 106 when the control channel logical numbers are substantially uniformly distributed among the selective call radios 106. The uniformity is typically improved when the control channel logical numbers are substantially uniformly assigned over a range which is the least common multiple (LCM) of the possible sizes of the set of control channels. For example, when the maximum number of control channels is 4, 5, or 6, the range is best set, respectively, to 12 (the LCM of 1, 2, 3, and 4), 60 (the LCM of 1, 2, 3, 4, and 5) and 60 (the LCM of 1, 2, 3, 4, 5, and 6).

In accordance with a first alternate embodiment of the present invention, the home channel identifier element 230 comprises a look-up table element 234 having the new number of control channels, N and the predetermined control channel logical number, L, as inputs, and the new home control channel, H, as the output. The new home control channel, H, is coupled to the subscriber data base 220. An example is shown below in Table 1, wherein the L values are row inputs, the N values are column inputs, and the H values are determined from the cell contents at the intersection of the rows and columns.

TABLE 1

| L | N | | | |
|---|---|---|---|---|
|   | 1 | 2 | 3 | 4 |
| 1 | 1 | 2 | 2 | 2 |
| 2 | 1 | 1 | 3 | 3 |
| 3 | 1 | 2 | 1 | 4 |
| 4 | 1 | 1 | 2 | 1 |
| 5 | 1 | 2 | 3 | 2 |
| 6 | 1 | 1 | 1 | 3 |
| 7 | 1 | 2 | 2 | 4 |
| 8 | 1 | 1 | 3 | 1 |

Thus, when an outbound message which has been scheduled for transmission within a transmission cycle is coupled to the cell site controller 202 by the message handler 204, the message handler also couples the home control channel assignment for the selective call radio 106 which is intended to receive the message, by looking up the home control channel assignment in the subscriber data base 220, using the selective call address which is associated with and stored with the message in the outbound message memory 208.

System controller 102 is preferably a model MPS2000® paging terminal manufactured by Motorola, Inc., of Schaumburg Ill., modified with unique firmware elements in accordance with the preferred embodiment of the present invention, as described herein. The cell site controller 202, the message handler 204, the outbound message memory 208, the subscriber data base 220, the telephone interface 206, the home channel identifier element 230, the channel organizer element 236, the control channel indicator element 238, the global event information element 240, and the global event indicator element 242 are preferably implemented-within portions of the model MPS2000® paging terminal which include, but are not limited to those portions providing program memory, a central processing unit, input/output peripherals, and a random access memory. The system controller alternatively could be implemented using a model E09PED0552 PageBridge® paging terminal manufactured by Motorola, Incorporated of Schaumburg, Ill. The subscriber data base 220 and the outbound message memory 208 can alternatively be implemented as magnetic or optical disk memory, which can alternatively be external to the system controller 102.

It will be appreciated that other types of global events exist. An example, which is indicated in FIG. 2 by the coupling of the message handler 204 to the global event indicator element 242 and the global event information element 240, is an all call message. When a message (such as a text message or a voice message) is determined by the message handler 204 to be intended for communication to all selective call radios 106 active in the radio communication system 100, it is an all call message. The all call message is a global event, which is coupled to the global event indicator element 242. The message information (such as alphanumeric text, analog signals, compressed analog voice, or digitized voice) is coupled to the global event information element 240, and is communicated to all active selective call radios 106 in the same manner as the home control channel information described above, although the all call message is more typically only communicated in one frame zero, not in each.

It will be appreciated that the global event information can alternatively be included in an alternatively predetermined frame 360 other than frame zero.

It will also be appreciated that in the first example of global events described above, in which a change of quantity of home channels is communicated to the multichannel radios, the channel organizer element 236 and the control channel indicator element act in combination as a global event element which determines the occurrence of the global event, and provides the global event information. In the second example of global events described above, in which an all call message is communicated to the multichannel radios, the message handler 204 acts as the global event element which determines the occurrence of the global event, and provides the global event information.

In accordance with a second alternative embodiment of the present invention, the global event indicator element 242 and the global event information element 240 are not included in the system controller 102, and the global event information is coupled directly to the cell site controller 202 for inclusion in every frame until all numbered frames have been transmitted once. As in the preferred embodiment of the present invention, the global event information must also be included in all subsequent frame zeroes if it is vital for system operation. It will be appreciated that global information is repeated many times in accordance with the second alternate embodiment of the present invention, which reduces overall outbound information throughput in the radio communication system 100 in comparison to the preferred embodiment of the present invention.

Figure 3:
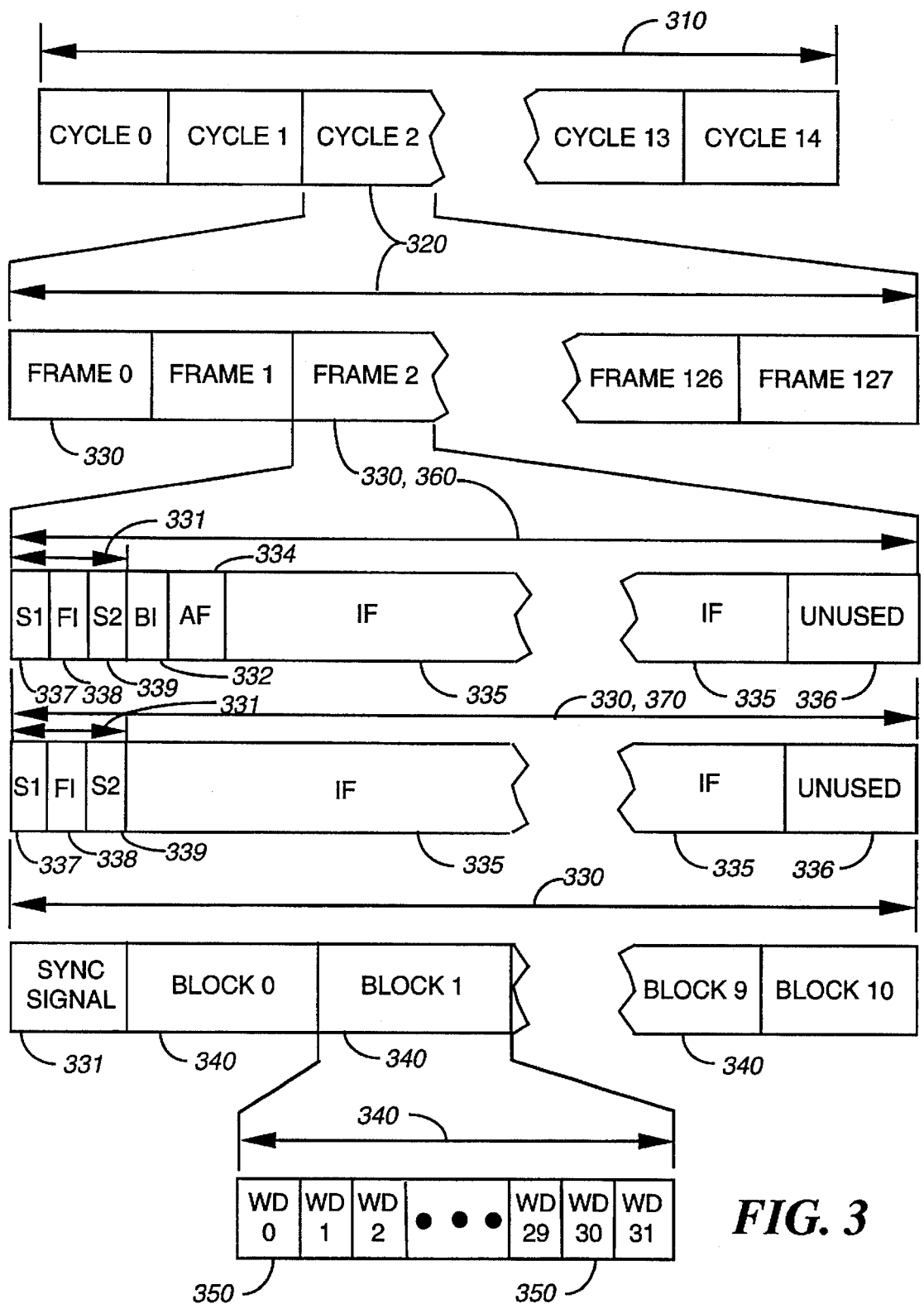
FIGS. 3, 4, and 5 are timing diagrams of frames included in a radio signal transmitted by a transmitter in radio communication system, in accordance with the preferred embodiment of the present invention.

Referring to FIG. 3, a timing diagram illustrating features of the transmission format of an outbound signaling protocol utilized by the radio communication system of FIG. 1 to transmit a message from the system controller 102 to the selective call radio 106 is shown, in accordance with the preferred and alternative embodiments of the present invention. The signaling protocol is similar to the FLEX™ protocol, which is a synchronous outbound signaling protocol in that both protocols have protocol divisions of cycle, frame, block, word, symbol, and bit which are equivalent in duration. The signaling protocol is subdivided into protocol divisions, which are an hour 310, a cycle 320, a frame 330, a block 340, and a word 350. Up to fifteen 4 minute uniquely identified cycles are transmitted in each hour 310. Normally, all fifteen cycles 320 are transmitted each hour. Up to one hundred twenty eight 1.875 second uniquely identified frames are transmitted in each of the cycles 320. Normally, all one hundred twenty eight frames are transmitted. One synchronization signal 331 lasting one hundred fifteen milliseconds and 11 one hundred sixty millisecond uniquely identified blocks 340 are transmitted in each of the frames 330. The synchronization signal includes a first sync portion 337, a frame information word 338, and a second sync portion 339. The frame information word 338 includes 21 information bits and 11 parity bits. The information bits identify a cycle number, a frame number, and include a bit which is set to one to indicate a global event. A bit rate of 1600 bits per second (bps), 3200 bps, or 6400 bps is usable during the blocks of each frame 330. The bit rate of the blocks of each frame 330 is communicated to the selective call radios 106 during the synchronization signal 331. When the bit rate is 1600 bps, 8 thirty two bit uniquely identified words 350 are transmitted in each block 340. For bit rates of 3200 bps or 6400 bps, 16 uniquely identified words or 32 uniquely identified words, respectively, each having 32 uniquely identified bits, are included in each block 340. In each word, at least 11 bits are used for error detection and correction, and 21 bits or less are used for information, in a manner well known to one of ordinary skill in the art. In some words, 15 bits are used for error detection and correction, and 17 bits are for information, in a manner well known to one of ordinary skill in the art. The bits and words 350 in each block 340 are transmitted in an interleaved fashion using techniques well known to one of ordinary skill in the art to improve the burst error correction capability of the protocol. The transmission cycle referred to above in the description of the system controller 102 with reference to FIG. 2 comprises a cycle 320.

A frame 330 is further defined to be one of two specific types depending upon the information found within the frame 330. The first type of frame 330 is a control frame 360. The second type of frame 330 is a data frame 370.

Information is included in each control frame 360 in fields, comprising system information in the frame information word 338 and a block information field (BI) 332, one or more selective call addresses with subvectors in an address field (AF) 333, one or more of a set of vector packets, short message packets, and long messages in the information field (IF) 335, and an unused field 336 having no useful information therein. Each selective call address with subvector is preferably two words in length. The subvector portion of the selective call address is preferably eight bits in length. Each vector packet and short message packet in the information field 335 of a control frame 360 corresponds to at least one of the addresses in the address field 333 of the same control frame 360. Each long message in the information field 335 corresponds to at least one vector packet in the information field 335 of at least one or more control frames 360. The boundaries of the fields 332, 333, 335, 336 are defined by the words 350, not by the blocks 340, and the length of the fields 332, 333, 335, 336 are variable, depending on factors such as the type and amount of system information included in the block information field 332, the type of addresses used, and the amount of information in each message. In particular, the boundary between the address field 333 and the information field 335 is referred to as the address field boundary 334. Thus, the length of each of the fields 332, 333, 335, 336 can be shorter or longer than a block 340. The unused field 336 can be zero length when the total of the lengths of the other fields 332, 333, 335 equals eleven blocks 340. All vector packets and short messages intended for a particular selective call radio 106 are preferably scheduled for transmission in a predetermined one or more of the frames 330 of each cycle 320, so as to allow the particular selective call radio 106 to go into a low power (non-receive) mode during other frames when short messages and vectors are not included for the particular selective call radio 106. The block information field 332 in this example includes two bits to indicate the number of active forward channels and two bits to indicate the number of forward channels which are control channels. The frequencies of the active and control channels are predetermined for each possible combination. It will be appreciated that additional or fewer bits could be used equally well for systems having more or fewer possible active and control channels.

Information is included in each data frame 370 in fields, comprising system information in the frame information word 338, long messages in the information field (IF) 335, and an unused field 336 having no useful information therein. A block information field (BI) 332 is not included in data frames 370 in accordance with the preferred embodiment of the present invention, but is optionally included in other embodiments. Each long message in the information field 335 corresponds to at least one vector packet in the information field 335 of at least one or more control frames 360. The boundaries of the fields 332, 335, 336 are defined by the words 350, not by the blocks 340, and the length of the fields 332, 335, 336 are variable, depending on factors such as the type and amount of system information included in the block information field 332 (when included), and the amount of information in the long messages.

The vectors contain information which specifies the starting word of a long message, in terms of the protocol divisions described above, and additionally, radio channel information such as radio channel frequency, sub channel offset from the radio channel frequency, side band, and in-phase or quadrature channel. The starting position and length of a long message, a short message, or a vector packet define the protocol position of the long message, short message, or vector packet. The protocol position can be on a different radio channel and in a different division (i.e., cycle, frame, block) of the protocol.

When a selective call radio 106 detects its address with subvector within a control frame 360, the selective call radio 106 is typically directed by the subvector to receive one of a vector packet or a short message packet within the control frame 360 wherein the address with subvector is detected. (In a limited number of cases, the address can include all the information needed to be conveyed to the selective call radio 106 in the form of a predetermined pattern of the subvector bits which are not used for position indication within the control frame 360, but rather for a limited number of messages having low information content. An example is an acknowledgment to an inbound message from the selective call radio 106)

When a selective call radio 106 decodes a vector packet in a control frame 360 which is associated with its selective call address, the selective call radio 106 is directed to receive and decode a long message in either the same control frame 360, or another control frame 360, or a data frame 370. The frame 330 in which the selective call radio is to receive the long message is in a radio signal transmitted in either a first radio channel where the selective call radio 106 detects its address with subvector, or a second channel different than the channel where the selective call radio detects its address with subvector.

Figure 4:
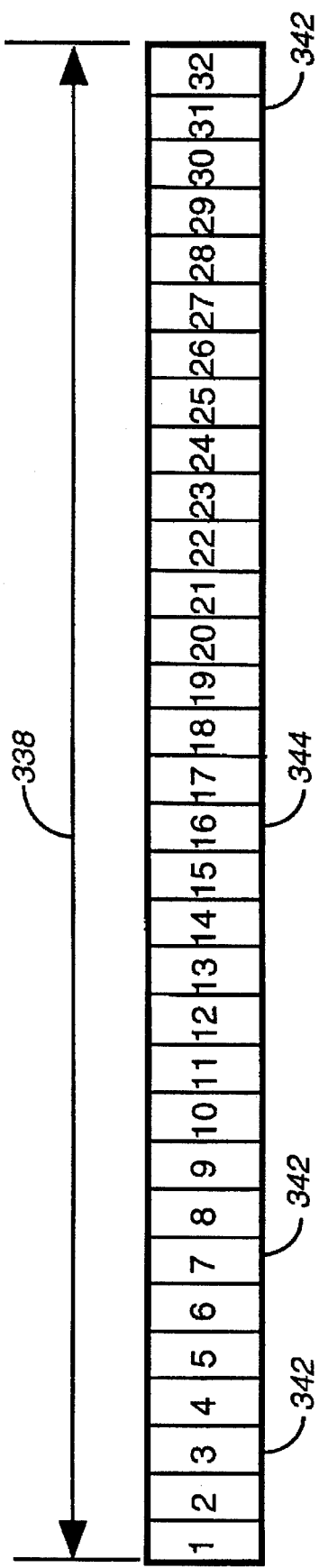

Referring to FIG. 4, a timing diagram illustrating the bit structure of the frame information word 338 used in the frames 360, 370 (FIG. 3) is shown, in accordance with the preferred and alternative embodiments of the present invention. The bits 342 in the frame information word are identified as bit one through bit thirty two. The global event indicator is a global bit sixteen 344 of the frame information word in the preferred embodiment of the present invention, although it will be appreciated that another bit 342 could be used equally well.

Figure 5:
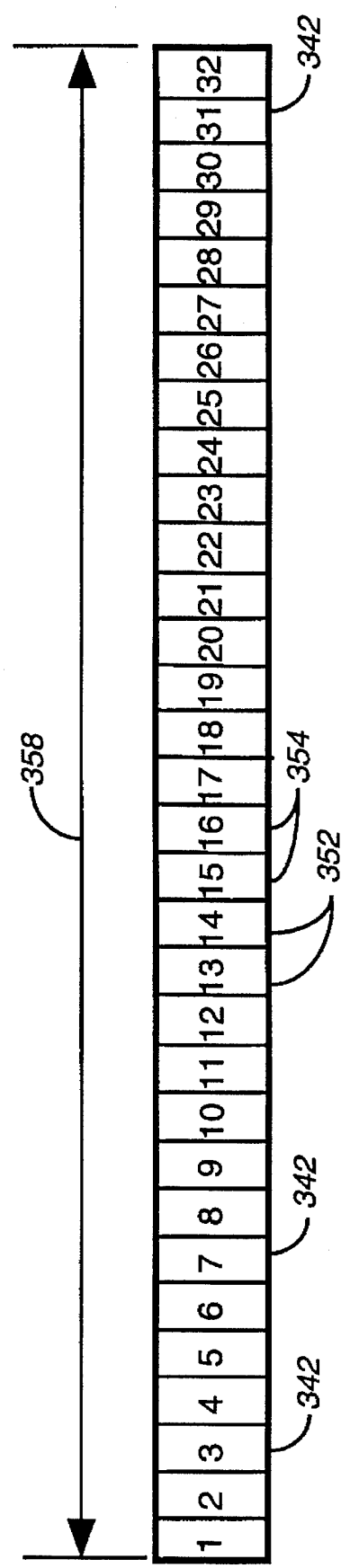

Referring to FIG. 5, a timing diagram illustrating the bit structure of block information word one 358 is shown, in accordance with the preferred and alternative embodiments of the present invention. Block information word one 358 is used to indicate the number of active forward channels and the number of forward channels which are control channels. The bits 342 in the block information word are identified as bit one through bit thirty two. The number of active forward channels is preferably indicated by bits thirteen and fourteen 352, and the number of forward channels which are control channels is preferably indicated by bits fifteen and sixteen 354 in the preferred embodiment of the present invention, although it will be appreciated that other bits 342 could be used equally well.

It will be appreciated that the global event indicator bit 344 could be alternatively included in the block information word, but that inclusion in the frame information word 338 has a benefit, in that a selective call radio 106 which is turned on in a cold start mode during the 4 minute cycle 320 in which a global event indicator is being sent, and prior to having an assigned, predetermined frame, or is turned on after the predetermined frame assigned to the selective call radio 106 (when the predetermined frame is stored from a prior time through the cold start), has passed, the selective call radio 106 will be delayed by an extra 4 minutes in receiving the global event information, or perhaps entirely miss the global event information (when it is sent only once). Also, in situations wherein a selective call radio 106 activates itself during each synchronization portion of a plurality of frames 360, 370 during a cycle 320, for example to maintain a highly accurate automatic frequency control of a receiver carrier frequency, the selective call radio 106 can overcome a situation in which the global event indicator is received in error during the predetermined frame 360 assigned for receiving messages.

Figure 6:
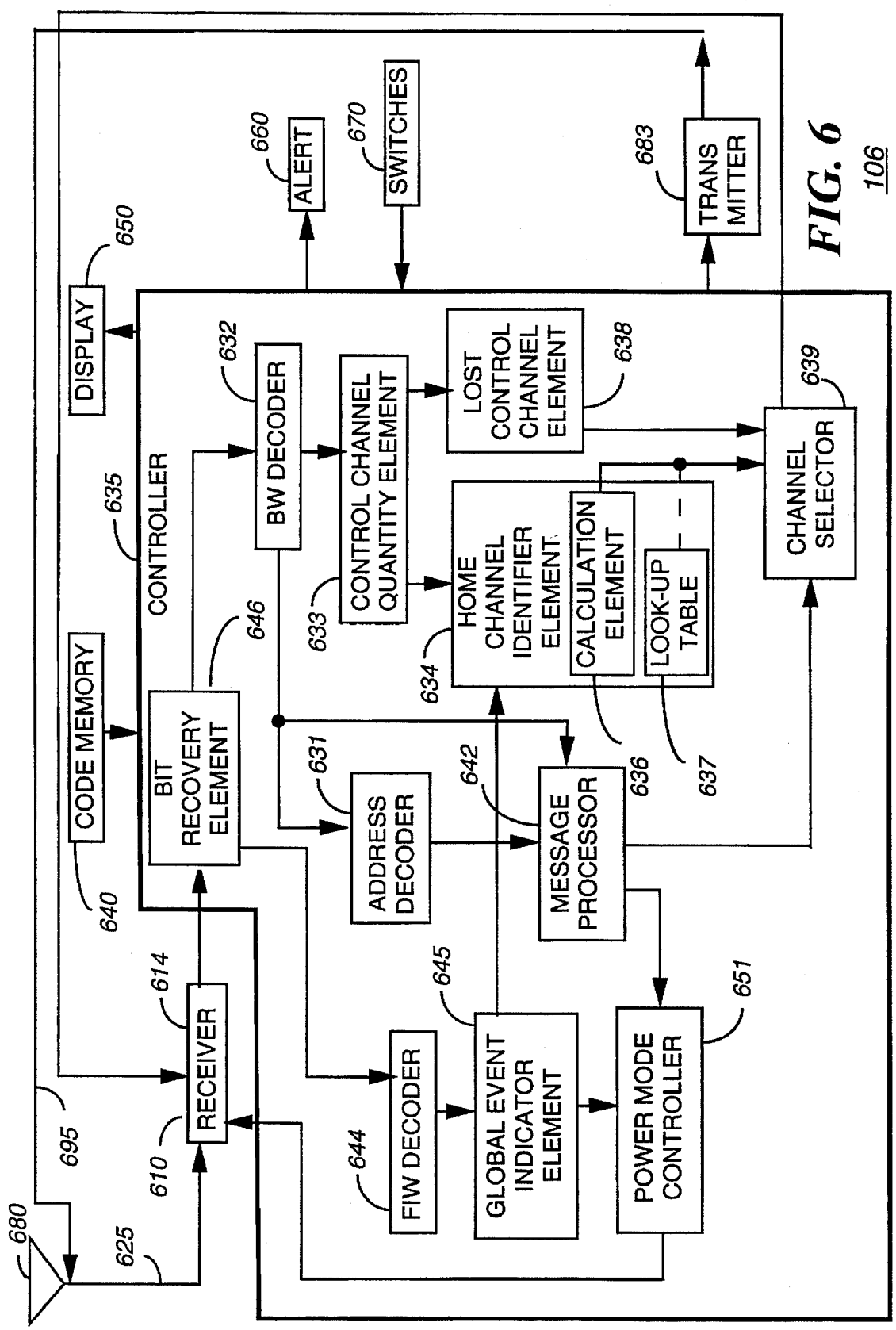
FIG. 6 is an electrical block diagram of a selective call radio used in the radio communication system, in accordance with the preferred embodiment of the present invention.

Referring to FIG. 6, an electrical block diagram of a multichannel selective call radio 106 with inbound messaging capability is shown, in accordance with the preferred and alternative embodiments of the present invention. The selective call radio 106 includes an antenna 680 for intercepting and transmitting radio signals. A first intercepted signal 625 in this example includes a control frame 360 which is transmitted within the home control channel at the protocol position (for example, frame two) predetermined for use by the selective call radio 106 when the selective call radio 106 is operating in its normal battery saving mode. Also in this example, a long message is included in a data frame 370 transmitted within a second outbound channel, which is not necessarily a control channel. The long message is intended for reception by the selective call radio 106. The data frame 370 which includes the long message is a data frame which occurs after the predetermined control frame 360 (frame two). The long message is a text message intended for presentation on display 650. Accordingly, the control frame 360 (frame two) includes the selective call address of the selective call radio 106, which includes a sub-vector indicating a position within the control frame 360 (frame two) of a vector which identifies the second outbound channel and the frame within the data frame 370 where the long message is located. The antenna 680 is coupled to a conventional receiver 610 and a conventional transmitter 683. The receiver 610 and the transmitter 683 are coupled to a controller 635. The controller 635 is coupled to a code memory 640, a display 650, an alert 660, and a set of switches 670. The controller 635 comprises a bit recovery element 646, a frame information word decoder 644, a global event indicator element 645, a power mode controller 651, a block word decoder 632, an address decoder 631, a message processor 642, a channel selector 639, a control channel quantity element 633, a home channel identifier element 634, and a lost control channel element 638. Just prior to receipt of the synchronization signal 331 of the control frame 360 which is at the predetermined protocol position (frame two) within the cycle 320, the power mode controller 651 sets a power mode of the selective call radio 106 to a normal power state, in which the receiver 610 begins receiving radio signals. The intercepted signal 625 is coupled to the receiver 610 wherein the intercepted signal 625 is received, which includes filtering to remove undesirable energy at off channel frequencies, amplification of the filtered signal, frequency conversion of the signal 625, and demodulation of the signal 625 in a conventional manner. The receiver 610 thereby generates a demodulated signal 614 which is coupled to the bit recovery element 646 of the controller 635.

The bit recovery element 646 recovers bits from the data symbols received at a predetermined outbound data rate in the demodulated signal 614, generating a binary signal. The binary signal includes the information transmitted in the frames 360 of this example in the form of data symbols, with errors possibly induced during the radio communication of the signal. The binary signal is coupled to the frame information word decoder 644 and the block word decoder 632. The frame information word decoder 644 performs error detection and correction decoding of the frame information words 338, in a manner well known to one of ordinary skill in the art. The block word decoder 632 performs error detection and correction decoding of the words 350 from the blocks 340, in a manner well known to one of ordinary skill in the art. When the frame information word 338 is sufficiently error free, it is coupled to the global event indicator element 645, which determines whether the global event indicator is set or not set. In accordance with the preferred embodiment of the present invention, the global event indicator is bit 16 of the frame information word 338. When the global event indicator is set, the global event indicator element 645 generates a global event signal which is coupled to the power mode controller 651 and the control channel quantity element 633.

The block word decoder 632 is coupled to the control channel quantity element 633, the address decoder 631, and the message processor 642. The control channel quantity element 633 determines a quantity of active outbound radio channels which are control channels from predetermined bits in the block information field 332, and couples the quantity to the home channel identifier element 634 and the lost control channel element 638. When a block information field 332 is included in a frame 360, 370 and decoded by the block word decoder 632, the quantity of control channels determined by the control channel quantity element 633 is used by the home channel identifier element 634 to determine a home channel. The home channel will typically be the same as the home channel determined from a previous frame, unless an undetected error occurs, no block information field is included, or a new home channel is determined due to a change in the number of control channels. Accordingly, when no global event signal has been coupled from the global event indicator element within the last cycle 320, the home channel identifier element 634 will couple a new home channel to the channel selector only when the home channel identifier element 634 has determined a new home channel consistently for a predetermined consecutive number of decoded block information fields, which is preferably two. When the selective call radio 106 receives no block information fields for a predetermined duration, the lost control channel element 638 couples a predetermined default control channel to the channel selector. In accordance with the preferred embodiment of the present invention, the predetermined default control channel is a predetermined control channel defined for use in the radio communication system when there is only one control channel. Thus, when a selective call radio 106 is turned on after having been off for some time and, for example, comes up on a channel which is not a control channel and has no block information field 332, the selective call radio 106 will switch to a control channel, determine the appropriate home control channel, and switch to it.

The home channel identifier element 634 preferably uses the calculation element 636 to determine the home channel from the quantity of control channels and a predetermined number stored in the selective call radio 106. The technique of determination and the definition of the predetermined number for the calculation element 636 is identical to that described with respect to the calculation element 232 of the system controller 102. In accordance with a third alternate embodiment of the present invention, the look-up table 637 can be used, in which the technique of determination and the definition of the predetermined number is identical to that described with respect to the look-up table element 234 of the system controller 102.

The controller 635 is coupled to a code memory 640, in which is stored one or more addresses assigned to the selective call radio 106, such as a local address (used in a "home" portion of the radio communication system 100), a "roaming" address (used in other portions of the radio communication system 100), and a group address (shared with other "home" selective call radios 106). The assigned address(es) are also referred to herein as the embedded addresses. When the controller 635 determines that the address field 333 of the control frame 360 (frame two), which includes the selective call address, is sufficiently error free the controller 635 couples the address field 333 to the address decoder 631 which compares each outbound selective call address in the control frame 360 (frame two) to the embedded addresses. When none of the outbound selective call addresses in the recovered control frame 360 (frame two) match any embedded selective call address before the address boundary 334 (FIG. 3), the controller 635 puts the selective call radio 106 into a low power mode in which the selective call radio 106 cannot receive radio signals, and the controller 635 ceases further processing of the demodulated signal 614 until the beginning of the next cycle 320 (inasmuch as the global event bit was set in this example) or, alternatively, until a later time when a subsequent control frame 360 (frame two) is transmitted at the predetermined position which potentially includes a selective call address for the selective call radio 106 (in the case when the global event bit is not set).

When any outbound selective call address in the recovered control frame 360 (frame two) and an embedded selective call address match, a valid address signal is coupled to the message processor 642, which responds by recovering the subvector portion of the address and determining the starting position of the vector as a number of words from the address boundary 334. The starting position is coupled from the message processor 642 to the power mode controller 651, which in response switches the selective call radio 106 to the low power mode until the starting position of the vector, at which time the power mode controller 651 switches the selective call radio 106 to the normal power mode. The words in the control frame 360 (frame two) which include the vector information are received by the receiver 610, decoded by the block word decoder 632, and coupled to the message processor 642. The duration of the vector is determined by the message processor 642 from information within the data packet and coupled to power mode controller 651, which switches the power mode to the low power mode at the end of the data packet. During the low power mode, processing of message information continues, but signal reception does not. The message processor 642 decodes the starting position of the long message from the vector, which includes in this example an indication that the long message is in a later frame position of the same cycle 320, in a data frame which is transmitted within the second outbound radio channel.

The message processor 642 generates a channel indicator for the long message which is coupled to the channel selector 639, and couples the decoded starting position of the long message to the power mode controller 651. The power mode controller 651 switches the power mode of the selective call radio 106 to the normal power mode and the channel selector 639 switches the receiving frequency of the receiver 610 to the frequency of the second outbound radio channel at the beginning of the long message. A second intercepted signal 625 is received by the receiver 610, decoded by the block word decoder 632, and the message processor 642 recovers the long message during the protocol position determined from the starting position determined from the vector and the length of the long message. The length of the long message is determined by the message processor 642 from information in the long message in the demodulated signal 614 and coupled to the power mode controller 651 and channel selector 639. At the end of the long message, the power mode controller 651 switches the power mode of the selective call radio 106 to the low power mode, and the channel selector 639 switches the receiving frequency of the receiver 610 to the frequency of the home control channel.

The controller 635 is coupled to a set of switches 670, to which the controller 635 is responsive for setting and controlling a plurality of operational modes of the selective call radio 106. Depending on the operational mode of the selective call radio 106, and depending on the contents of the long message, the controller 635 couples information included in the long message to a display 650 for presentation and stores information included in the long message for later presentation. Also depending on the operational mode of the selective call radio 106, a sensible alert device 660, for example, a tone alert device or a vibration alert device, is activated in response to the alert signal.

In this example, upon determining that the long message includes a text message, the controller 635 couples the text message to the display 650 and generates an encoded acknowledgment message. The acknowledgment message is coupled to the transmitter 683, which generates an RF transmit signal 695. The RF transmit signal 695 is coupled to the antenna 680 and transmitted.

In response to the global event signal from the global event indicator element 645, the power mode controller 651 sets the selective call radio 106 into the normal power state at the beginning of frame zero 330 of the next cycle 320. A third intercepted signal 625 is received by the receiver 610 at the frequency of the home control channel and decoded by the block word decoder 632. In response to the global event signal coupled from the global event indicator element 645, the control channel quantity element 633 determines a home channel (which may be the same as the last home channel) from the quantity of control channels and the predetermined number, and couples the new home channel to the channel selector at the end of the block information field 332, thus effecting a relatively fast changeover to the new home channel as a result of the global event. At the end of the block information field 332, the power mode controller 651 switches the power mode of the selective call radio 106 to the low power mode.

It will be appreciated that when the global event indicator is set, a global event other than a change in quantity of home control channels can be indicated, either alternatively or additionally. For example, a text message is identified for processing by all selective call radios 106, by using a unique selective call address bit pattern, such as is defined for many information protocols. In accordance with the preferred embodiment of the present invention, the all call, or global address, is indicated by an all 1 pattern in 17 predetermined bit locations of a two word address in the address field 333 of frame zero. The selective call radio 106 includes the all call address as one of the embedded addresses and the address decoder decodes this pattern when it is included in any frame (when the selective call radio 106 is in the receive state). The subvector associated with the all call address indicates the location in frame zero at which the vector for the text message begins, unless the text message is short (e.g., less than six words long), in which case the text message is typically included in the frame zero and the location of the text message is indicated by the subvector.

It will be appreciated that in the two examples of global events described above, the control channel quantity element 633 and the address decoder 631 each perform a global event information decoding function, and the home channel identifier element 634 and message processor 642 perform information processing functions, respectively, for the information decoded by the control channel quantity element 633 and the address decoder 631.

The receiver 610 in the preferred and alternative embodiments of the present invention in FIG. 6 is preferably a conventional dual conversion receiver of a type well known to those skilled in the art, but can alternatively be of other conventional types, such as a single conversion or zero intermediate frequency (ZIF) receiver. The code memory 640 is conventional EPROM, or conventional SRAM or another conventional memory type which is well known to those skilled in the art. The display 650 is an LCD display of a type well known to those skilled in the art, and the antenna 680, switches 670, and alert device 660 are devices also well known to those skilled in the art. The controller 635 is preferably implemented within a controller section which includes, but is not limited to conventional hardware circuits including a microprocessor, timing circuits, random access memory, non-volatile memory such as EPROM, and input/output circuitry. The conventional functions of the bit recovery element 646, the block word decoder 632, the frame information word decoder 644, and the address decoder 631 as described herein are controlled by firmware routines developed in accordance with techniques well known to one of ordinary skill in the art. The unique functions of the global event indicator element 645, the power mode controller 651, the block word decoder 632, the message processor 642, the channel selector 639, the control channel quantity element 633, the home channel identifier element 634, and the lost control channel element 638 as described herein are controlled by unique firmware routines developed in accordance with techniques well known to one of ordinary skill in the art. The microprocessor is preferably one of the 68HC05 family microprocessors made by Motorola, Inc. of Schaumburg, Ill. The transmitter 683 is a conventional low power transmitter of a type well known to those skilled in the art.

It will be appreciated that the techniques described herein for determining a home control channel and for communicating a global event are equally useful in a system in which the multichannel radios are not selective call radios, for example a system in which each multichannel radio is assigned a predetermined frame of a home control channel in which all information in the frame is for all such multichannel radios assigned to the same frame on the same channel. When the number of control channels is made larger or smaller, the radios become distributed, respectively, into smaller or larger groups of radios which receive at each frame time. When a global event indication is sent, all radios listen to frame zero as described above. It will also be appreciated that the technique described herein for communicating a global event is effective in a radio communication system 100 having a single outbound radio channel, as well as the multichannel system described.

Figure 7:
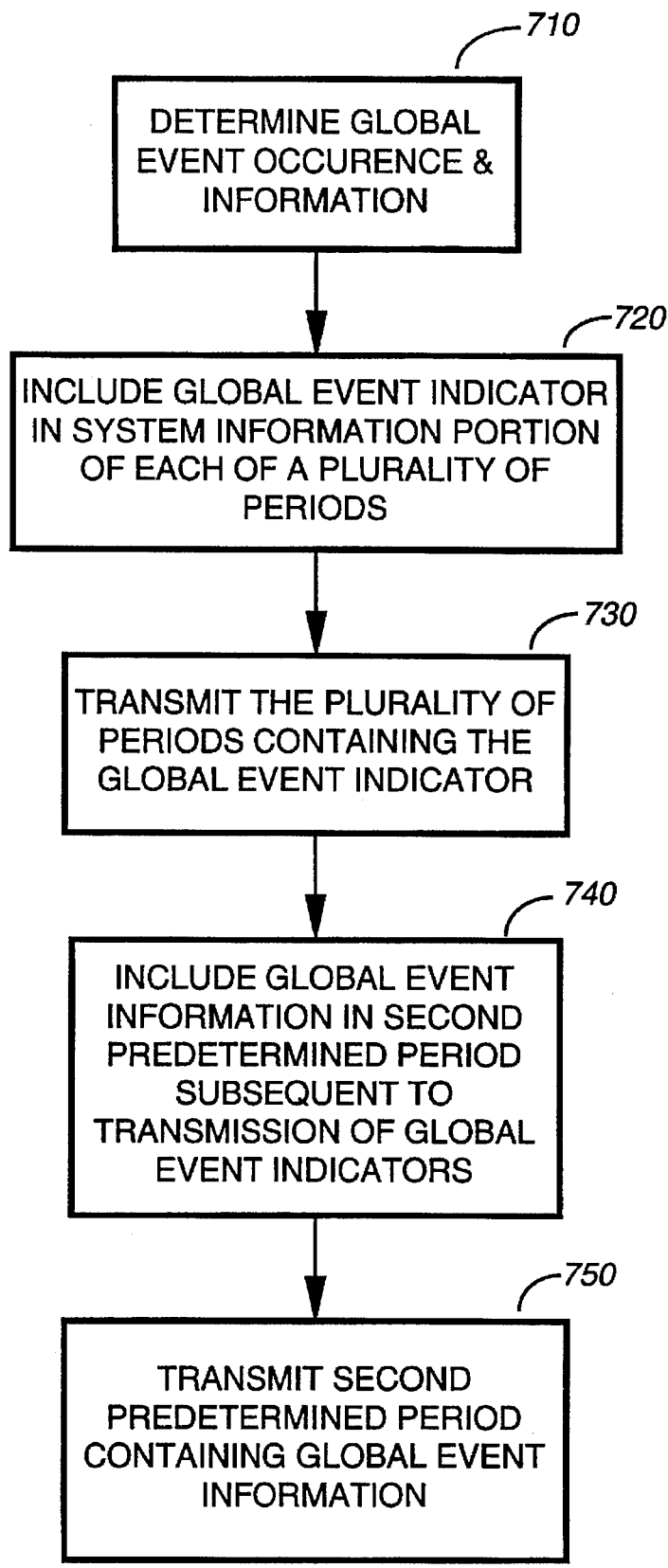
FIG. 7 is a flow chart of a method used in the system controller, in accordance with the preferred embodiment of the present invention.

Referring to FIG. 7, a flow chart is shown which illustrates a method used in a system controller 102 of the radio communication system 100 for communicating global event information all radios which are active, in accordance with the preferred embodiment of the present invention. At step 710, a determination is made of a global event occurrence and of global event information associated with the global event occurrence. The global event could be a change of control channels or a message, as described above, or other information, such as a change in a number of active inbound channels used for responses and acknowledgments, or a change in a bit rate to be used as a default bit rate on an inbound channel. At step 720, the system controller 102 includes a one bit global event indicator in a system information portion of all the control frames 360 included during a cycle of a outbound signaling protocol transmitted. The outbound signaling protocol has protocol divisions of cycle, frame, frame synchronization, block, word, and .bit. When the radio communication system has a multiplicity of outbound control channels, the global event indicator is preferably sent in all the control frames 360 on all outbound control channels, although it will be appreciated that the global event can alternatively be sent on fewer than all the control channels when the global event information is pertinent to selective call radios 106 on fewer than all channels. The global event indicator is preferably included in the synchronization signal 331 of the system information portion of the control frame 360.

At step 730, a radio signal which includes the cycle 320 including the control frames 360 which include the global event indicator is transmitted from a radio transmitter/receiver 103. At step 740, the system controller 102 includes the global event information in a predetermined frame, preferably frame zero of the cycle subsequent to the cycle in which the global event indicator is included. At step 750, the subsequent cycle which includes the global event information is transmitted from the transmitter/receiver 10, preferably on all control channels.

Figure 8:
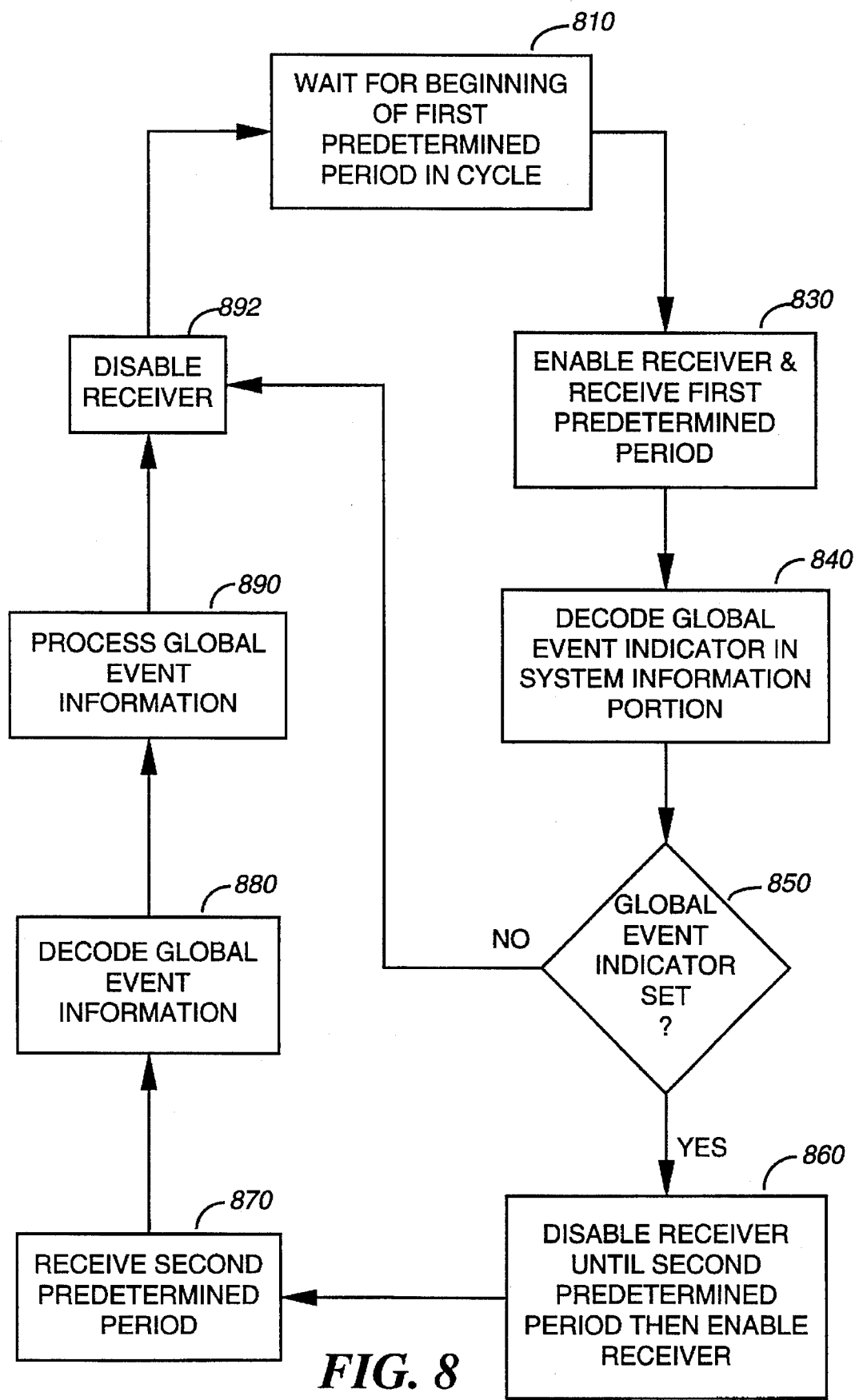
FIG. 8 is a flow chart of a method used in the selective call radio, in accordance with the preferred embodiment of the present invention.

Referring to FIG. 8, a flow chart is shown which illustrates a method used in a selective call radio 106 of the radio communication system 100 for receiving global event information, in accordance with the preferred embodiment of the present invention. At step 810 the selective call radio 106, which is synchronized with the outbound signaling protocol described above in accordance with the preferred embodiment of the present invention, waits for the start of a first frame number, for example frame 94, which is predetermined by a first number assigned to and stored within the selective call radio 106. At step 830, the selective call radio 106 enables receipt of information for the duration of the first frame 330 (frame 94, which has the first frame number) within the selective call radio 106, as for example by switching from a low power mode in which the receiver 610 does not receive radio signals to a high power mode in which the receiver 610 does receive radio signals, or for example, by simply enabling a disabled decode function at start of the first frame 330. The selective call radio 106 decodes the synchronization signal 331 associated with the first frame 330 including the global event indicator at step 840. When the global indicator is set to indicate a global event, the selective call radio 106 disables receipt of information at the end of the first frame until the time at which a control frame 360 which is a second frame 360 (having a predetermined second frame number) is transmitted by the system controller 102 in the next cycle of the outbound signaling protocol, unless the first frame is a control frame 360 which includes information to which the selective call radio 106 responds by remaining active during one or more frames 330 between the first frame 330 and the second frame 360. The second predetermined number is preferably zero. At step 870, the selective call radio 106 enables receipt of information during the second frame 366. A unique address in the address field 333 of the second frame 360 indicates that global information is included in the second frame 360 and is intended for all selective call radios 106, and indicates where the start of the information is located. Once the start of the information is located, the selective call radio 106 locates and decodes the remainder of the information at step 880 as described above with reference to FIGS. 3 and 6. The information is processed according to its content, as described with reference to FIG. 6. The selective call radio 106 then again disables receipt of information at step 892 and the process continues at step 810.

By now it should be appreciated that there has been provided a technique for communicating global event information to a plurality of radios which normally operate in a non-receive state except at differing predetermined times during transmission cycles. The technique substantially improves the efficiency of communicating the global information, particularly for global events which require the use of more information to communicate the global event, in comparison to sending the information in group calls or individual calls communicated within the differing predetermined times, or in comparison to prior art systems which use all words in a cycle to indicate a global event.

We claim:

1. A method used in a system controller for efficiently communicating global information to a plurality of radios in a radio communication system in which each of said plurality of radios is in a receive state during a synchronization portion of one or more predetermined periods of a plurality of transmission cycles and in which each of said plurality of radios is not necessarily in a receive state during a first predetermined period of each of the plurality of transmission cycles, the method comprising the steps of:

determining a global event occurrence and global event information associated with the global event occurrence, wherein the global event information is for communication to the plurality of radios;

including a global event indicator in the synchronization portion of each of a plurality of periods, including the one or more predetermined periods, which are for transmission in a first transmission cycle, and wherein the global indicator indicates that the plurality of radios are to be set in the receive state during the first predetermined period of the second transmission cycle;

transmitting the plurality of periods during the first transmission cycle;

including the global event information in the first predetermined period which is for transmission in a second transmission cycle which is subsequent to the first transmission cycle; and transmitting the first predetermined period in the second transmission cycle.

2. The method according to claim 1, wherein the first transmission cycle and the second transmission cycle are cycles of an outbound signaling protocol, and wherein the plurality of periods and the first predetermined period are frames of the outbound signaling protocol, and wherein the synchronization portion is a synchronization signal of the outbound signaling protocol and wherein the outbound signaling protocol has protocol divisions which include the cycles, the frames, the synchronization signal, blocks, words, and bits, and wherein the protocol divisions are equivalent in quantity, duration, and numbering to respectively defined divisions of a FLEX™ protocol.

3. The method according to claim 2, wherein a frame number of the first predetermined period is zero.

4. The method according to claim 1, wherein the global event indicator in said step of including a global event indicator is one bit of the synchronization portion.

5. The method according to claim 1, wherein the plurality of periods in said step of including a global event indicator includes all periods in the first transmission cycle.

6. A method used in a radio for receiving global information in a radio communication system in which said radio is in a receive state during a synchronization portion of a first predetermined period of a plurality of transmission cycles and is not necessarily in a receive state during a second predetermined period of each of the plurality of transmission cycles, comprising the steps of:

receiving the first predetermined period of a first transmission cycle;

decoding a global event indicator in the synchronization portion of the first predetermined period;

setting the radio to the receive state during the second predetermined period of a second transmission cycle in response to the global indicator, wherein the second transmission cycle is subsequent to the first transmission cycle;

receiving the second predetermined period;

decoding global event information in the second predetermined period; and processing the global event information.

7. The method according to claim 6, wherein the first transmission cycle and the second transmission cycle are cycles of an outbound signaling protocol, and wherein the first predetermined period and the second predetermined period are frames of the outbound signaling protocol, and wherein the synchronization portion is a synchronization signal of the outbound signaling protocol and wherein the outbound signaling protocol has protocol divisions which include the cycles, the frames, the synchronization signal, blocks, words, and bits, and wherein the protocol divisions are equivalent in quantity, duration, and numbering to respectively defined divisions of a FLEX™ protocol.

8. The method according to claim 7, wherein a frame number of the second predetermined period is zero.

9. The method according to claim 6, wherein the global event indicator in said step of decoding a global event indicator is one bit of the synchronization portion.

10. A system controller for efficiently communicating global information to a plurality of radios in a radio communication system in which each of said plurality of radios is in a receive state during a synchronization portion of one or more predetermined periods of a plurality of transmission cycles and in which each of said plurality of radios is not necessarily in a receive state during a first predetermined period of each of the plurality of transmission cycles, the system controller comprising:

a global event element for determining a global event occurrence and global event information associated with the global event occurrence, wherein the global event information is for communication to the plurality of radios;

a global event indicator element coupled to said global event element for including a global event indicator in the synchronization portion of each of a plurality of periods, including the one or more predetermined periods, which are for transmission in a first transmission cycle, and wherein the global indicator indicates that the plurality of radios are to be set in the receive state during the first predetermined period of the second transmission cycle;

a global event information element coupled to said global event element for including the global event information in the first predetermined period which is for transmission in a second transmission cycle which is subsequent to the first transmission cycle; and a cell site controller coupled to said global event indicator element and said global event information element for sending the first transmission cycle and second transmission cycle to a transmitter/receiver for radio transmission.

11. The system controller according to claim 10, wherein the first transmission cycle and the second transmission cycle are cycles of an outbound signaling protocol, and wherein the plurality of periods and the first predetermined period are frames of the outbound signaling protocol, and wherein the synchronization portion is a synchronization signal of the outbound signaling protocol and wherein the outbound signaling protocol has protocol divisions which include the cycles, the frames, the synchronization signal, blocks, words, and bits, and wherein the protocol divisions are equivalent in quantity, duration, and numbering to respectively defined divisions of a FLEX™ protocol.

12. The system controller according to claim 11, wherein a frame number of the first predetermined period is zero.

13. The system controller according to claim 11, wherein the plurality of periods in said step of including a global event indicator includes all periods in the first transmission cycle.

14. The system controller according to claim 10, wherein the global event indicator included by said global event indicator element is one bit of the synchronization portion.

15. A radio for receiving global information in a radio communication system in which said radio is in a receive state during a synchronization portion of a first predetermined period of each of a plurality of transmission cycles and is not necessarily in a receive state during a second predetermined period of each of the plurality of transmission cycles, comprising:

a receiver for receiving the first predetermined period of a first transmission cycle;

a global event indicator element coupled to said receiver for decoding a global event indicator in the synchronization portion of the first predetermined period;

a receive state controller, coupled to said receiver and said global event indicator element, for setting the radio to the receive state during the second predetermined period of a second transmission cycle, wherein the second transmission cycle is subsequent to the first transmission cycle;

said receiver further for receiving the second predetermined period;

an information decoder, coupled to said receiver, for decoding global event information in the second predetermined period; and a information processor, coupled to said information decoder, for processing the global event information.

16. The radio according to claim 15, wherein the first transmission cycle and the second transmission cycle are cycles of an outbound signaling protocol, and wherein the first predetermined period and the second predetermined period are frames of the outbound signaling protocol, and wherein the synchronization portion is a synchronization signal of the outbound signaling protocol and wherein the outbound signaling protocol has protocol divisions which include the cycles, the frames, the synchronization signal, blocks, words, and bits, and wherein the protocol divisions are equivalent in quantity, duration, and numbering to respectively defined divisions of a FLEX™ protocol.

17. The radio according to claim 16, wherein the second predetermined period is frame number zero.

18. The radio according to claim 15, wherein the global event indicator decoded by said global event indicator element is one bit of the synchronization portion.

* * * * *